United States Patent
Deker et al.

(10) Patent No.: US 8,825,401 B2
(45) Date of Patent: Sep. 2, 2014

(54) DEVICE FOR FLIGHT PLAN DISPLAY WITH DISPLACEMENT BASED ON JUMPS

(75) Inventors: Guy Deker, Cugnaux (FR); Michel Roger, Blagnac (FR); Emmanuel Roux, Leguevin (FR)

(73) Assignee: Thales, Neuilly-sur-Seine (FR)

( * ) Notice: Subject to any disclaimer, the term of this patent is extended or adjusted under 35 U.S.C. 154(b) by 905 days.

(21) Appl. No.: 12/732,658

(22) Filed: Mar. 26, 2010

(65) Prior Publication Data

US 2010/0250117 A1 Sep. 30, 2010

(30) Foreign Application Priority Data

Mar. 27, 2009 (FR) .................. 09 01508

(51) Int. Cl.
*G01C 23/00* (2006.01)
*G08G 5/00* (2006.01)

(52) U.S. Cl.
CPC ............ *G01C 23/005* (2013.01); *G08G 5/0017* (2013.01); *G08G 5/0026* (2013.01); *G08G 5/0047* (2013.01); *G08G 5/0052* (2013.01)
USPC ............................... 701/533; 701/3; 701/418

(58) Field of Classification Search
CPC . G01C 23/005; G08G 5/0017; G08G 5/0026; G08G 5/0047; G08G 5/0052
USPC ........... 701/3, 4, 26, 411, 418, 428, 429, 431, 701/439, 440, 454, 467, 528, 538
See application file for complete search history.

(56) References Cited

U.S. PATENT DOCUMENTS

| | | | | |
|---|---|---|---|---|
| 5,884,219 | A | * | 3/1999 | Curtwright et al. ........... 701/455 |
| 6,522,958 | B1 | * | 2/2003 | Dwyer et al. .................... 701/3 |
| 6,542,796 | B1 | | 4/2003 | Gibbs et al. |
| 6,571,171 | B1 | * | 5/2003 | Pauly ............................ 701/528 |
| 6,633,810 | B1 | * | 10/2003 | Qureshi et al. ................ 701/467 |
| 6,690,299 | B1 | * | 2/2004 | Suiter ........................... 340/973 |
| 6,909,967 | B2 | * | 6/2005 | Hirano et al. ................. 701/410 |
| 7,321,318 | B2 | * | 1/2008 | Crane et al. ................... 340/971 |
| 7,603,209 | B2 | * | 10/2009 | Dwyer et al. ................... 701/14 |
| 8,050,860 | B2 | * | 11/2011 | Peyrucain et al. ............ 701/467 |
| 8,219,265 | B2 | * | 7/2012 | Dwyer et al. .................... 701/4 |
| 2005/0182528 | A1 | * | 8/2005 | Dwyer et al. .................... 701/3 |
| 2006/0005147 | A1 | | 1/2006 | Hammack et al. |
| 2008/0027629 | A1 | | 1/2008 | Peyrucain et al. |
| 2012/0022778 | A1 | * | 1/2012 | Mishra ......................... 701/206 |

FOREIGN PATENT DOCUMENTS

FR 2 904 461 A1 2/2008

* cited by examiner

*Primary Examiner* — John Q Nguyen
*Assistant Examiner* — Michael Whalen
(74) *Attorney, Agent, or Firm* — Baker & Hostetler LLP

(57) ABSTRACT

A device for displaying a flight plan of an aircraft is disclosed. The device includes a control unit with at least one first display area including a textual list of identifiers of points, a textual list of identifiers of segments, or both that are representative of a portion of the flight plan. A display of the textual lists are centered around a current central display point, the current central display point corresponding to a point of the flight plan or a segment of the flight plan. The device further includes means for displacing by jumps the flight plan portion displayed in the first display area by selecting a new point different from the current central display point, the selected new point becoming a new central display point after selection thereof.

12 Claims, 4 Drawing Sheets

DEVICE FOR FLIGHT PLAN DISPLAY WITH DISPLACEMENT BASED ON JUMPS

CROSS-REFERENCE TO RELATED APPLICATIONS

This application claims priority to foreign France patent application No. 0901508, filed on Mar. 27, 2009, the disclosure of which is hereby incorporated by reference in its entirety.

FIELD OF THE INVENTION

The present invention relates to aircraft flight management systems, designated by the acronym FMS standing for the expression "Flight Management System", and more particularly to a flight plan display device.

BACKGROUND OF THE INVENTION

FMS flight management systems are well known. They make it possible to formulate the flight plan of an aircraft on each mission, by taking account of parameters specific to the aircraft and to the flight conditions such as the payload, the weight of the aircraft, the quantity of fuel on board, the temperature, the wind as well as time constraints imposed by the ATC air traffic control bodies: required departure and/or arrival time slot.

The flight plan describes notably the set of points ("waypoints") or positions above which the aircraft must pass, with notably the corresponding altitude and speed at each point. It provides a vertical flight profile for the various phases of the aircraft, typically the climb phase CLB, the cruising phase CRZ and the descent phase DES.

Several types of flight plan are considered by FMS systems. The pilot usually has at his disposal an active flight plan, a temporary flight plan and one or more secondary flight plan(s).

The active flight plan is the flight plan currently undergoing processing and the latter controls the aircraft's automatic pilot.

The temporary flight plan is a copy of the active flight plan to which modifications are made by the pilot, such as for example the addition or modification of points or turning points. This flight plan can thereafter become the active flight plan when the pilot so decides.

The secondary flight plan is a stored flight plan that may be selected as active flight plan by decision of the pilot.

In the current realizations, the information relating to these various flight plans is displayed in the aircraft flight deck by using two screens. A first screen, usually called the navigation screen, and designated by the acronym ND standing for the expression "Navigation Display", makes it possible to graphically display the active, temporary, and/or secondary flight plans, projected horizontally on the terrestrial surface. A second screen, called the control and display unit, or simply the control unit and usually designated by the acronym CDU standing for the expression "Control Display Unit", serves as interface for displaying each flight plan, comprising notably the list of points of the flight plan with their predictions of time, altitude, speed, fuel and wind and with the parameters between the points (name of route or procedure, distance, angle of route, etc.). The pilot can, with the aid of this interface, make modifications to each of the flight plans.

To verify the content of a flight plan, the crew need to view the trajectory graphically with the aid of a display by using, for example, the navigation screen ND. Moreover, a textual display usually taking the form of a textual list of the segments and points of a flight plan makes it possible to take cognizance of the details so as notably to validate the said plan. This textual display is implemented, for example, with the aid of the control unit.

Navigation and control screens have a limited display capability on account of their size. Textual display of the list of points is very useful since the verification of a flight plan based solely on the trajectory displayed graphically on the navigation screen ND is insufficient. Indeed, there are not enough information elements related to the points on the graphical display, such as, for example, speed predictions. There are also not enough information elements displayed related to the segments. Moreover, the graphical display of the trajectory on the navigation screen can only be done over a maximum display radius, usually of the order of 320 Nm. This maximum radius is also designated by the word "range". With this display scale, it is difficult to effect global and accurate verification of the trajectory associated with the flight plan.

In order to verify the flight plan in detail, the pilot has the control unit at his disposal. The latter also having limited display capabilities related to its size, the pilot is afforded the possibility, in the current systems, of scrolling the list of points of the flight plan so as to be able to access the entire content of the said flight plan. The displacement by scrolling of the flight plan portion displayed has formed notably the subject of the patent entitled Methods and apparatus for integrating, organizing, and accessing flight planning and other data on multifunction cockpit displays (U.S. Pat. No. 6,542,796).

Usually, the pilot is afforded the possibility of browsing through the textual display of a flight plan page by page with the aid of scrolling keys symbolized by up and down arrows, or else with the aid of a pointing ball, also called a "trackball".

The existing schemes making it possible to move around in the list of displayed points and segments of a flight plan do not allow fast access to a chosen portion of the said plan. Indeed, in the current systems, the pilot must scroll this list continuously for arrival at the portion in which he is interested.

SUMMARY OF THE INVENTION

An aim of the invention is notably to alleviate the aforesaid drawbacks.

For this purpose the subject of the invention is a device for displaying flight plans of an aircraft comprising a control unit with at least one first display area comprising a textual list of identifiers of points, of pseudo-points and/or of segments that is representative of a portion of the flight plan, the display of the said list being centred around a central display point, the said point corresponding to a point, a pseudo-point or a segment of the flight plan. The device comprises means for displacing by jumps the flight plan portion displayed in the first display area by selecting a different central display point from the current central display point, the said selected point becoming the new central display point.

According to an aspect of the invention, the device comprises means for selecting a new central display point from among the points of the textual list of the flight plan portion displayed in the first display area.

According to another aspect of the invention, the control unit comprises a second display area comprising a textual list of the navigation procedures representative of the flight plan as well as means for changing the central display point by selecting one of the said navigation procedures.

When the current navigation procedure is selected, the central display point is, for example, the next point of the flight plan situated just in front of the current position of the aircraft.

When a different navigation procedure from the current procedure is selected, the central display point is, for example, the first point of the said procedure.

In an embodiment, the central display point is emphasized by using one of the following display techniques: framing, underlining, application of a colour contrasting with that used for the other points, reverse video, display in bold.

The navigation procedure to which the central display point belongs can be emphasized by using one of the following display techniques: framing, underlining, application of a colour contrasting with that used for the other navigation procedures, reverse video, display in bold.

In an embodiment, the current navigation procedure is emphasized by using one of the following display techniques: framing, underlining, application of a colour contrasting with that used for the other navigation procedures, reverse video, display in bold.

According to an aspect of the invention, the device comprises a navigation screen, the said screen making it possible to graphically display at least one portion of at least one flight plan, the display of the said portion being centred around a central display point, the said device comprising means for selecting a point of the flight plan portion displayed on the navigation screen, the said selected point becoming the new central display point.

The device comprises, for example, a scrolling key whose activation makes it possible to advance the displayed portion of the flight plan in the downstream direction from the current central display position, doing so as far as the last displayed point of the flight plan situated at a distance equal to at most a display radius from the said current central display position.

The device comprises, for example, a scrolling key whose activation makes it possible to advance the displayed portion of the flight plan as far as the last point of the said flight plan.

According to another aspect of the invention, the device comprises a scrolling key whose activation makes it possible to retreat the displayed portion of the flight plan in the upstream direction from the current central display position as far as the remotest displayed point situated at a distance equivalent to at most a display radius from the said current central display position.

The device comprises, for example, a scrolling key whose activation makes it possible to retreat the displayed portion of the flight plan as far as the point corresponding to the current position of the aircraft.

The device according to the invention comprises, for example, a pointing ball associated with at least one selection key making it possible to select by displacing a cursor and by pressing the said key an element of the first display area of the control unit, a navigation procedure for the second display area, or a point of the portion of flight plan displayed on the navigation screen.

BRIEF DESCRIPTION OF THE DRAWINGS

Other characteristics and advantages of the invention will become apparent with the aid of the description which follows given by way of nonlimiting illustration, and in regard to the appended drawings among which.

MORE DETAILED DESCRIPTION

Figure 1:
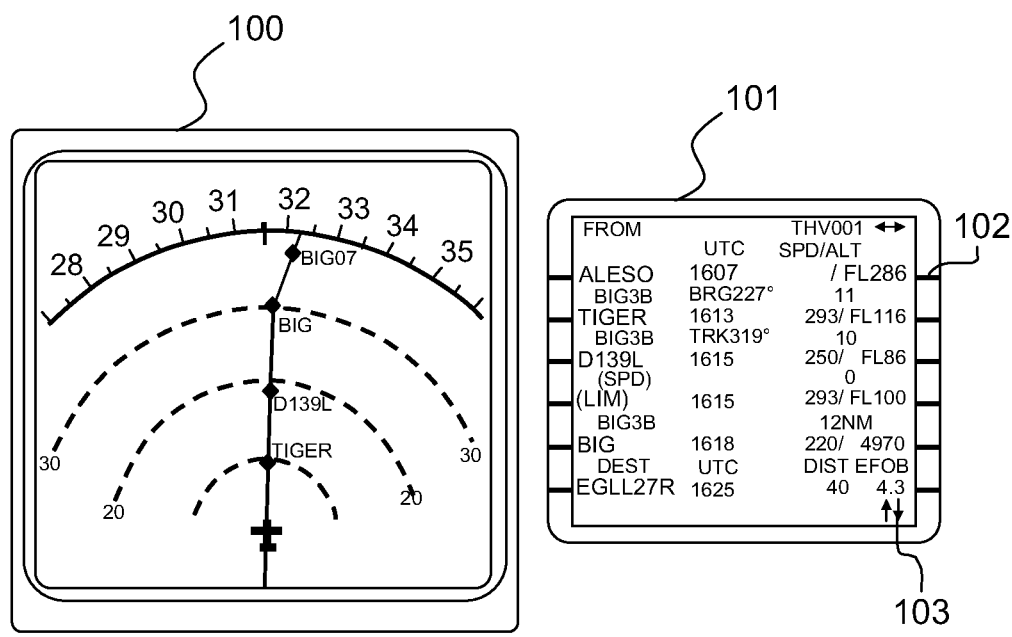
FIG. 1 presents an exemplary FMD system navigation screen and control unit.

FIG. 1 presents an exemplary FMS system navigation screen and control unit. The navigation screen 100 is used to graphically display the trajectory of at least one flight plan, for example the active flight plan. In the example of the figure, several points of the flight plan appear, their identifiers being TIGER, D139L, BIG and BIG07.

Usually, two types of flight information may be associated with the points and with the segments of a flight plan. The first is a set of target values notably in terms of position or of speed, for example. The second type is a set of predicted values, that is to say values calculated by the FMD system. This information is accessible on a second screen 101, called the control unit. The textual list of the points and/or segments making up the temporary flight plan is displayed. In this example, the list of points making up the active flight plan is displayed. Thus, the points TIGER, D139L and BIG appear therein. Predictions on arrival are also displayed. The point LIM between parentheses and not appearing on the navigation screen is a floating point (also called a pseudo-waypoint) calculated on the vertical profile at the altitude at which a speed restriction applies when entering the terminal flight area of an airport. In the example of the figure, the said pseudo point appears only on the control unit. Thus, an arrival level with the last point of the flight plan is forecast at 16:25 and the aircraft is at a distance of 40 nautical miles from the said point.

Usually, the complete list of points of the flight plan is accessible by scrolling it, for example with the aid of keys corresponding to scrolling arrows and situated in proximity to the control unit 101. A sign 103 displayed on the control unit and having the appearance of up and down arrows indicates to the pilot, for example, that there are other points higher up or lower down and that the scrolling keys are active.

By interacting with an interface associated with the control unit, the pilot is also afforded the possibility of adding or deleting points. This interaction can be implemented, for example, with the aid of line keys 102.

Figure 2:
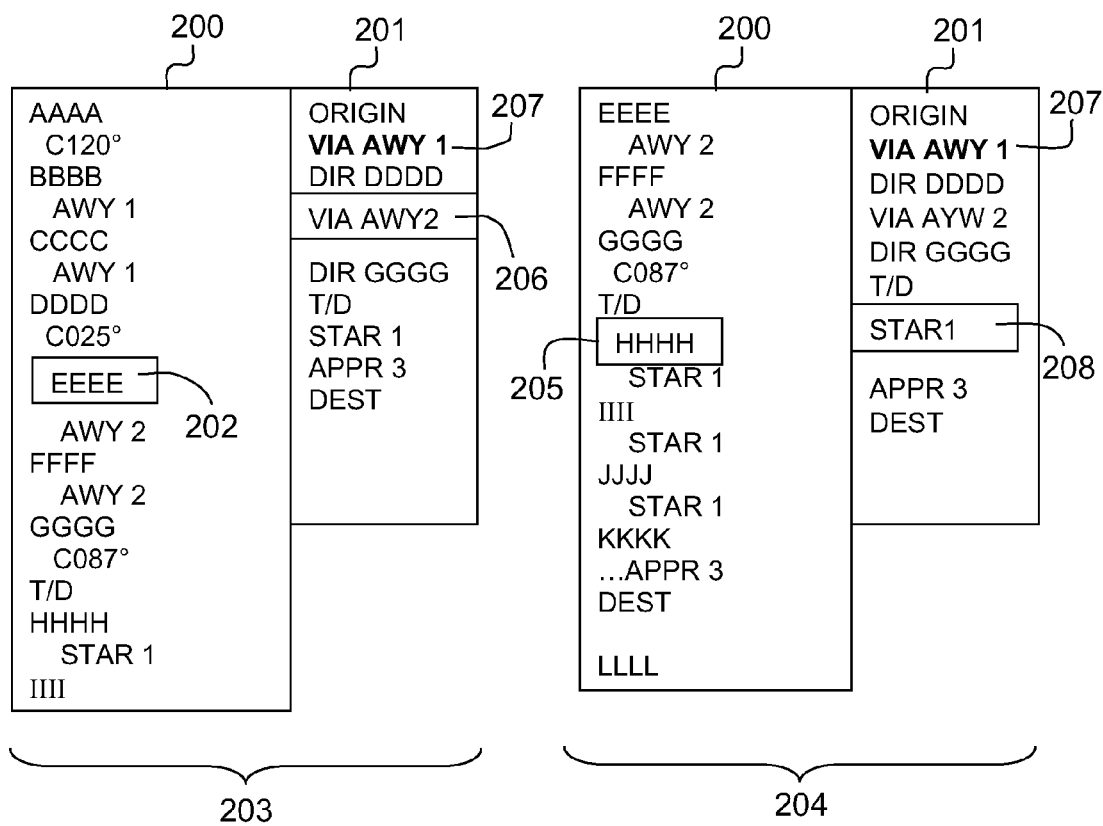
FIG. 2 illustrates a textual mode of display of at least one flight plan as well as schemes for selecting the displayed portion of the said flight plan.

FIG. 2 illustrates a textual mode of display of at least one flight plan as well as schemes for selecting the displayed portion of the said flight plan.

A textual list of points and segments of a portion of a flight plan can be displayed on the control unit. In another embodiment, this list can also be displayed on the navigation screen jointly with the graphical display of the trajectory.

The pilot displaces, for example, a cursor onto a point of the displayed textual list. The said point is thereafter selected. The consequence of this selection is the centring on this point of the textual list as well as, for example, of the trajectory displayed graphically on the navigation screen. The selected point becomes the central display point (also called the reference point). An exemplary implementation making it possible to select a reference point of the flight plan is given further on in the description in conjunction with FIG. 4.

The textual display according to the invention can be divided into at least two display sectors or areas. A first sector 200 presents a list of points and of segments belonging to a given flight plan. A second sector 201 presents the list of navigation procedures associated with the said flight plan. Two examples 203, 204 of displayed portions of the flight plan are given. To go from one display 203 to the other 204, two schemes are proposed within the framework of the invention.

The first scheme is described as short-term jump-based displacement and the second scheme is described as a long-term jump-based displacement scheme.

Long-term jump-based displacement makes it possible to move around rapidly within the flight plan by displaying a portion of the said plan remotely with respect to the current portion displayed.

In the first exemplary display 203 of FIG. 2, ten points appear in the first sector 200 and are named AAAA, BBBB, CCCC, DDDD, EEEE, FFFF, GGGG, T/D, HHHH, IIII. Moreover, 8 segments are displayed, i.e. C120°, AWY 1, C025°, AWY 2, C087° and STAR 1.

The point EEEE is the central display point or display reference point. To differentiate the display reference point from the other points of the displayed portion of the flight plan, the latter can for example be framed 202. This framing is then a visual marker indicating which point serves as reference for the display of the trajectory on the navigation screen ND.

In the list of procedures 201, the procedure VIA AWY1 to which the display reference point 202 belongs is, for example, framed 206. The list of procedures 201 can be viewed as a summary of the flight plan. The procedure to which the display reference point 202 belongs can also be framed 206 so as to pinpoint the said reference point in the summary of the flight plan.

The procedure in progress 207, that is to say the one that the aircraft is currently following, can be highlighted. This highlighting 207 is carried out, for example, by spotlighting the name of the procedure or by reverse video, that is to say by reversing the background colour and the foreground colour.

The pilot can change central display point and go, for example, from a display centred on the point EEEE 203 to a display centred on the point HHHH 204. Following its selection, the point HHHH is framed 205 and becomes the new reference point both on the textual list and on the graphical display. Likewise, so also 208 is the procedure STAR1 which contains the reference point.

This first displacement scheme is called the short-term or point-based displacement scheme because of the selecting of the reference point without changing the display of the list of points. The principle of the device according to the invention consists in displacing the displayed portion of a flight plan by changing the central display point on the basis of a selection. This scheme makes it possible to jump around in the flight plan by selecting one of the displayed points. The displacements enabled by this scheme make it possible to move around by only a few points, since the number of points displayed on the control unit is limited.

A second displacement scheme can also be envisaged within the framework of the invention. This scheme is described as the long-term displacement scheme or procedure selection. The selecting of the display reference point can be done on the basis of the list of procedures. The procedures represent a form of operational summary of the flight plan. This list of procedures displays the origin, the references of the departure procedures used and air routes. The off-procedure points are also displayed and grouped into blocks of n elements as a function of the available size of the window of the screen. For example, it will be possible to display 5 to 10 elements. The references of the arrival procedures and the destination are also displayed. When they exist, the pseudo-points, characteristic of the vertical trajectory, can be inserted into the list of procedures. For the active flight plan, the procedure in progress, that is to say the one that the aircraft is currently following, is emphasized. Selecting the procedure in progress will induce a centring of the textual display on the TO point, that is to say the next point that the aircraft will pass, in the procedure, recalling that the points preceding the FROM point, the last point that the aircraft passed, are not displayed.

As explained previously, the list of procedures 201 is a summary of the flight plan. It comprises notably the procedures used in the construction of the flight plan as well as the main pseudo-points characteristic of the vertical part of the flight plan such as the start-of-cruising point and the end-of-cruising point. When an element of the list of procedures is selected, the display of the list of procedures is centred on the said element. The display reference point 205 is then for example the first point of the selected procedure. Consequently, the list of points is centred on this reference point. The trajectory displayed graphically on the navigation screen ND is centred, for example, around the same point. To emphasize the display reference point, the latter can be framed 206, 208 in the list of procedures, in the same manner as for the short-term displacement scheme.

When the procedure in progress is selected, then the list of points and the trajectory are centred, for example, on the point just in front of the aircraft since the previous points are of no immediate interest to the pilot. It is nevertheless possible to access these points by selecting the first point of the displayed list. This point then becomes the central point of the portion of list displayed, as explained previously.

Figure 3:
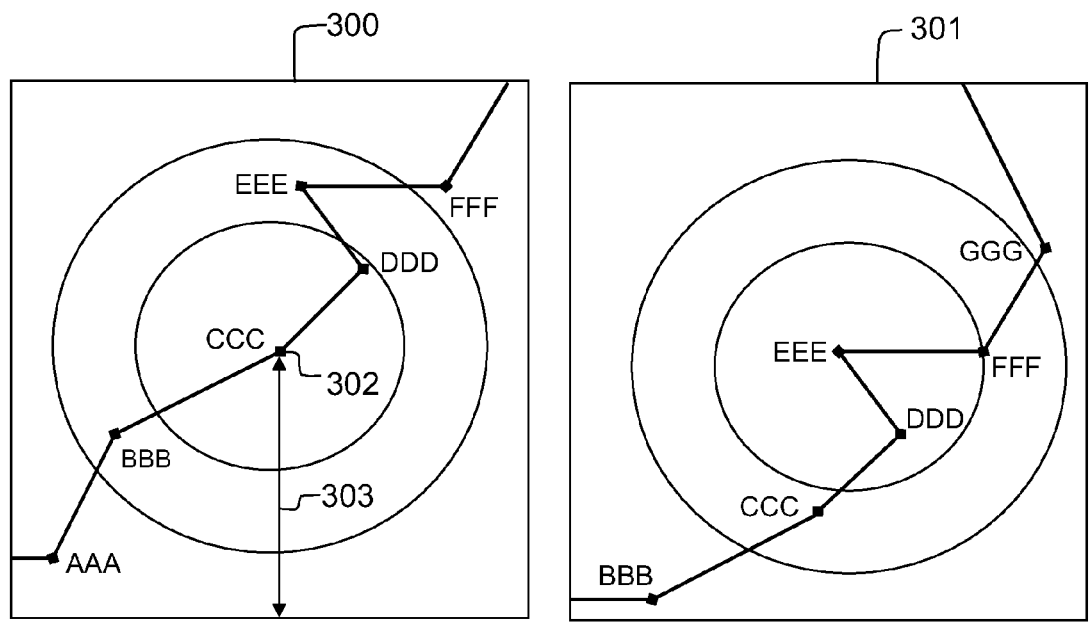
FIG. 3 gives an exemplary displacement scheme based on selecting a point of a graphically displayed portion of a flight plan.

FIG. 3 gives an exemplary displacement scheme based on selecting a point of a flight plan portion displayed graphically, for example on a navigation screen. The principle is that when the pilot selects a point of the graphically displayed portion of the flight plan, the trajectory is, for example, centred on the said point. In the example of the figure, a parametrized navigation screen with a given display radius 303 is represented at two different instants before 300 and after 301 the pilot has selected a new central display point. In this example, the flight plan portion displayed before recentring is centred around the point CCC 302. In order to centre the displayed portion of the flight plan around the point EEE, the pilot selects the said point. The displayed portion 301 is then centred on the point EEE 304. An exemplary man-machine interface making it possible to select the central point is given in the subsequent description in conjunction with FIG. 5.

Figure 4:
FIG. 4 gives an example of keys making it possible to displace the flight plan portion displayed graphically on the navigation screen.

FIG. 4 gives an example of keys making it possible to displace the flight plan portion displayed graphically on the navigation screen.

A scheme making it possible to recentre the flight plan portion displayed on the navigation screen, based on the pilot selecting a point, has been explained previously with the aid of the example of FIG. 3. However, it is not usually possible for all the points of the flight plan to be displayed on the navigation screen at the same moment. In order to rapidly displace the flight plan portion displayed, it may be beneficial to use advance and retreat keys. The pilot of the aircraft can thus navigate along his trajectory, and therefore the list of points with the aid of advance or retreat keys on the navigation screen ND.

Pressing a first key 400, identified for example by an upward-directed single arrow, makes it possible to advance in the downstream direction from the current central position, doing so as far as the closest point situated a distance equal to at least one display radius from the said current central position. For example, for a display radius of 160 Nm, the new reference point will be the first point situated more than 160 Nm from the central display point.

A second key 401, identified for example by an upward-directed double arrow, makes it possible to advance to the last point of the flight plan, that is to say to the final destination.

A third key 402, identified for example by a downward-directed single arrow, makes it possible to retreat in the upstream direction from the current central position as far as the closest point situated a distance equivalent to at least one display radius from the said current central position. For example, for a display radius of 160 Nm, the new central display point will be the last point situated less than 160 Nm from the current reference point.

A fourth key 403, identified for example by a downward-directed double arrow, makes it possible to retreat to the point corresponding to the current position of the aircraft.

Figure 5:
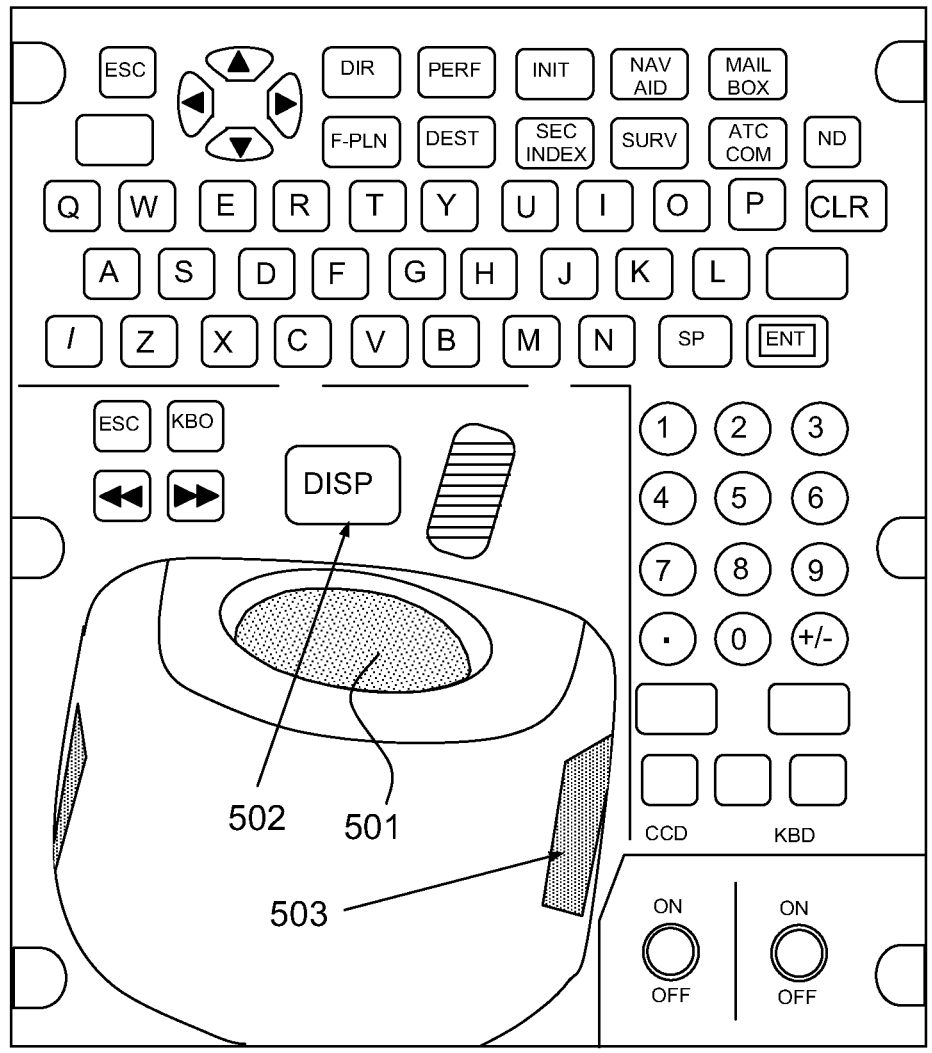
FIG. 5 presents an exemplary pointing ball making it possible to displace a cursor on a control unit and/or a navigation screen and to select a flight plan central display point.

FIG. 5 presents an exemplary pointing ball making it possible to displace a cursor on a control unit and/or a navigation screen and to select a flight plan central display point. A pointing ball 501 makes it possible to displace a cursor so as to select the new central display point. Keys 502, 503 situated in proximity to the pointing ball 501 make it possible to select a point, a segment or a procedure so as to displace the displayed portion of the flight plan. The displacement schemes such as described previously in the description are for example used.

A first key 502 makes it possible to consult the possible actions from among, for example, flight plan consultation or revision actions. A second key 503 is situated, for example, to the right or in front of the pointing ball, and makes it possible to displace the display so as to centre it around a central display point, such as described previously. This second key serving to displace the display can be associated with a dedicated symbol, for example an eye or an abbreviation such as "DISP", for example.

What is claimed is:

1. A device for displaying a flight plan of an aircraft, comprising:
   a control unit with a first display area including a textual list of identifiers of waypoints that are representative of a portion of the flight plan, a display of the textual list being centered around a current central display point, the current central display point corresponding to a waypoint of the flight plan;
   means for displacing by jumps the portion of the flight plan displayed in the first display area by selecting a new point different from the current central display point, the selected new point becoming a new central display point after selection thereof,
   wherein the control unit further includes a second display area comprising a textual list of navigation procedures representative of the flight plan as well as means for changing the current central display point by selecting one of the navigation procedures, and
   wherein when a current navigation procedure is selected, the new central display point is a next point of the flight plan situated just in front of a current position of the aircraft.

2. The device according to claim 1, further comprising means for selecting the new central display point from among the points of the textual lists of the flight plan portion displayed in the first display area.

3. The device according to claim 1, wherein when a navigation procedure different from a current navigation procedure is selected, the new central display point is a first point of the navigation procedure different from the current navigation procedure.

4. The device according to claim 1, wherein the current central display point is emphasized by using one of the following display techniques: framing, underlining, application of a second color that contrasts with a first color used for other points, reverse video, or display in bold.

5. The device according to claim 1, wherein a navigation procedure corresponding to the current central display point is emphasized by using one of the following display techniques: framing, underlining, application of a first color that contrasts with a second color used for other navigation procedures, reverse video, or display in bold.

6. The device according to claim 1, wherein a current navigation procedure is emphasized by using one of the following display techniques: framing, underlining, application of a first color that contrasts with a second color used for other navigation procedures, reverse video, or display in bold.

7. The device according to claim 1, further comprising:
   a navigation screen, the navigation screen enabling graphical display of at least one portion of the flight plan, the display of the portion of the flight plan being centered around the current central display point; and
   means for selecting a new point of the flight plan portion displayed on the navigation screen, the selected new point of the flight plan portion displayed on the navigation screen becoming the new central display point.

8. The device according to claim 7, further comprising a scrolling key whose activation enables advancing the displayed portion of the flight plan in a downstream direction from a current central display position, doing so as far as a last displayed point of the flight plan situated at a distance equal to at most a display radius from the current central display position.

9. The device according to claim 7, further comprising a scrolling key whose activation makes enables advancing the displayed portion of the flight plan as far as a last point of the flight plan.

10. The device according to claim 7, further comprising a scrolling key whose activation enables retreating the displayed portion of the flight plan in an upstream direction from the current central display point as far as a most remote displayed point situated at a distance equivalent to at most a display radius from the current central display point.

11. The device according to claim 7, further comprising a scrolling key whose activation enables retreating the displayed portion of the flight plan as far as a point corresponding to a current position of the aircraft.

12. The device according to claim 1, further comprising a pointing ball associated with at least one selection key whose activation enables selecting by displacing a cursor and by pressing the selection key an element of the first display area of the control unit, a navigation procedure for the second display area, or a point of the portion of flight plan displayed on the navigation screen.

* * * * *